United States Patent [19]
Thornton et al.

[11] Patent Number: 6,101,952
[45] Date of Patent: Aug. 15, 2000

[54] VEHICLE GUIDANCE AND SWITCHING VIA MAGNETIC FORCES

[75] Inventors: Richard D. Thornton, Concord; Tracy M. Clark, Bedford; Dariusz A. Bushko, Hopkinton, all of Mass.

[73] Assignee: MagneMotion, Inc., Acton, Mass.

[21] Appl. No.: 08/998,232

[22] Filed: Dec. 24, 1997

[51] Int. Cl.$^7$ ........................................ B60L 13/04
[52] U.S. Cl. .................. 104/282; 104/130.02; 104/283; 104/284; 246/227
[58] Field of Search ................. 104/130.02, 130.03, 104/281, 282, 283, 286; 246/227, 228, 229, 231, 233, 234; 74/572

[56] References Cited

U.S. PATENT DOCUMENTS

| | | |
|---|---|---|
| 3,029,893 | 4/1962 | Mountjoy . |
| 3,440,600 | 4/1969 | Frech et al. . |
| 3,532,934 | 10/1970 | Ballman . |
| 3,609,676 | 9/1971 | Janquet et al. . |
| 3,628,462 | 12/1971 | Holt . |
| 3,636,508 | 1/1972 | Ogilvy et al. . |
| 3,679,874 | 7/1972 | Fickenscher . |
| 3,763,788 | 10/1973 | Pougue ........................... 104/130.02 |
| 3,768,417 | 10/1973 | Thornton et al. . |
| 3,772,640 | 11/1973 | Auer, Jr. et al. . |
| 3,786,411 | 1/1974 | Kurauchi et al. . |
| 3,845,720 | 11/1974 | Bohn et al. ..................... 104/130.02 |
| 3,858,521 | 1/1975 | Atherton . |
| 3,874,299 | 4/1975 | Silva et al. ..................... 104/130.02 |
| 3,906,436 | 9/1975 | Kurauchi et al. . |

(List continued on next page.)

FOREIGN PATENT DOCUMENTS

| | | |
|---|---|---|
| 0 229 669 | 7/1987 | European Pat. Off. . |
| 1418 128 | 12/1975 | United Kingdom . |
| WO 95/21405 | 8/1995 | WIPO . |

OTHER PUBLICATIONS

Inductive Power Transfer to an Electric Vehicle–Analytical Model Author: Manochehr Eghtesadi.

The Roadway Powered Electric Vehicle—An All–Electric Hybrid System Authors: Edward H. Lechner and Steven E. Shladover.

Inductive Power Transfer to an Electric Vehicle Authors: Khosrow Lashkari, Steven E. Shladover and Edward H. Lechner.

U.S. Patent Application No. 92–11687 Title: Asynchronous Bidirectional Network Interface Enabling Seamless Concurrent Processing in a Distributed Heterogeneous Multiprocessor System.

*Primary Examiner*—S. Joseph Morano
*Assistant Examiner*—Robert J. McCarry, Jr.
*Attorney, Agent, or Firm*—Nutter, McClennen & Fish LLP; David J. Powsner

[57] ABSTRACT

A system for guidance and/or switching of a vehicle or other object comprises a guideway, a guide plate that moves along the guideway, and a magnetic field source that induces a magnetic force between the guide plate and at least a portion of the guideway over which the guide plate is moving. The guide plate is attached to the vehicle or coupled to its steering systems. The magnetic force centers the guide plate along the guideway by opposing any lateral deviation from center. The magnetic field source is a permanent magnet, an electromagnet (including a superconducting magnet) or any other known magnetic field source. It is preferably included in, or forms part of, the guide plate. Likewise, the guide rail preferably comprises ferromagnetic or paramagnetic material, i.e., a material that forms a temporary magnet in the presence of the magnetic field of the source. Thus, for example, one aspect of the invention provides a system of vehicle guidance in which the guide plate comprises an arrangement of permanent magnets that slide over a ferromagnetic, e.g., steel, guideway rail.

66 Claims, 11 Drawing Sheets

U.S. PATENT DOCUMENTS

| | | |
|---|---|---|
| 3,927,735 | 12/1975 | Miericke et al. . |
| 3,979,091 | 9/1976 | Gagnon et al. . |
| 4,023,753 | 5/1977 | Dobler . |
| 4,061,089 | 12/1977 | Sawyer . |
| 4,132,175 | 1/1979 | Miller et al. . |
| 4,292,465 | 9/1981 | Wilson et al. . |
| 4,361,202 | 11/1982 | Minovitch . |
| 4,441,604 | 4/1984 | Schlig et al. . |
| 4,522,128 | 6/1985 | Anderson . |
| 4,592,034 | 5/1986 | Sachse et al. . |
| 4,665,829 | 5/1987 | Anderson . |
| 4,665,830 | 5/1987 | Anderson et al. . |
| 4,671,185 | 6/1987 | Anderson et al. . |
| 4,726,299 | 2/1988 | Anderson . |
| 4,776,464 | 10/1988 | Miller et al. . |
| 4,794,865 | 1/1989 | Lindberg . |
| 4,914,539 | 4/1990 | Turner et al. . |
| 5,108,052 | 4/1992 | Malewicki et al. . |
| 5,152,227 | 10/1992 | Kato ........ 104/286 |
| 5,161,758 | 11/1992 | Shuto ........ 246/419 |
| 5,178,037 | 1/1993 | Mihirogi ........ 74/569 |
| 5,180,041 | 1/1993 | Shuto ........ 191/53 |
| 5,193,767 | 3/1993 | Mihirogi ........ 246/418 |
| 5,199,674 | 4/1993 | Mihirogi ........ 246/434 |
| 5,214,981 | 6/1993 | Weinberger et al. ........ 74/572 |
| 5,247,890 | 9/1993 | Mihirogi ........ 104/130 |
| 5,251,563 | 10/1993 | Staehs et al. . |
| 5,267,514 | 12/1993 | Staehs et al. . |
| 5,277,124 | 1/1994 | DiFonso et al. . |
| 5,277,125 | 1/1994 | DiFonso et al. . |
| 5,293,308 | 3/1994 | Boys et al. . |
| 5,325,974 | 7/1994 | Staehs . |
| 5,409,095 | 4/1995 | Hoshi et al. . |
| 5,435,429 | 7/1995 | Van Den Goor . |
| 5,452,663 | 9/1995 | Berdut ........ 104/283 |
| 5,517,924 | 5/1996 | He et al. ........ 104/282 |
| 5,590,604 | 1/1997 | Lund . |
| 5,590,995 | 1/1997 | Berkers et al. . |
| 5,595,121 | 1/1997 | Elliott et al. . |

Front View

Side View

VEHICLE GUIDANCE AND SWITCHING VIA MAGNETIC FORCES

BACKGROUND OF THE INVENTION

This invention pertains to vehicular transport and, more particularly, to methods and apparatus for the guidance and switching of vehicles.

Vehicle guidance is an important part of any transportation system and for centuries a sequence of new schemes have been devised to guide or steer a vehicle. For example, conventional railroads use conical wheels and a solid axle to provide guidance, while a flange on the wheel provides backup guidance in case an exceptionally strong force is required. Automobiles use steered wheels which depend upon traction with a road to provide guidance. Air cushion vehicles use air pressure for both vertical suspension and horizontal guidance. Magnet levitation (maglev) vehicles utilize magnetic forces for both suspension and guidance. Some transportation systems use rubber tired wheels for suspension with additional guidance wheels that interact with special guidance rails to control the direction of vehicle travel. Some of the more recent patents on these and related topics are: U.S. Pat. Nos. 3,628,462; 3,768,417; 3,858,521; 3,927,735; 4,061,089; 4,522,128; and 5,277,124.

All guidance systems must have means to choose between alternate directions of travel. Automobiles use steered wheels to control lateral motion, a method that works well when traction is good but works poorly in wet or icy conditions when traction is bad. Conventional trains use switches with mechanically movable rails, a system that works well in some applications but takes several seconds to activate and is prone to maintenance problems. Magnetic or air cushion suspended vehicles use switches that require motion of large sections of a guideway. Accordingly, these latter systems have the same disadvantages as trains, in addition to high cost. Although the art has additionally proposed certain uses of magnetic forces to guide magnetically suspended vehicles (e.g., as described in U.S. Pat. Nos. 3,768,417; 3,858,52 and 3,927,735), these generally do not have broad application.

In order to allow vehicles to operate with headways of 1 second or less, systems for automated material handling or personal rapid transit have used lateral guidance wheels with mechanically movable parts on the vehicle to initiate switching; this is exemplified in U.S. Pat. Nos. 4,061,089; 4,522, 128; 5,277,124. These systems all depend upon movable wheels that engage either a left or a right guidance rail according to the preferred direction of travel. These guidance and switching means tend to cause substantial mechanical drag forces and, require considerable maintenance.

Since all guidance systems have both strengths and weaknesses, there has been a continual search for new methods of achieving guidance.

In view of the foregoing, an object of the invention is to provide improved methods and apparatus for vehicle guidance and switching. A more particular object of the invention is to provide such methods and apparatus as can be applied to all types of vehicles, regardless of the mechanisms by which they are suspended and/or steered.

A further object of the invention is to provide such methods and apparatus as can be applied to guidance of wheeled "road" vehicles, such as automobiles, buses and trucks. A related object is to provide such methods and apparatus for "track" vehicles, such as trains, trolleys, personal rapid transits vehicles and baggage-carrying vehicles.

A still further object of the invention is to provide such methods and apparatus as require few, if any, moveable mechanical guidance components and, therefore, which can be applied in low headway applications, such as personal rapid transit.

Yet still another object of the invention is to provide such methods and apparatus as can be utilized to guide and switch vehicles on friction, as well non-friction, surfaces.

These and other objects of the invention are evident in the drawings and in the description that follows.

SUMMARY OF THE INVENTION

The foregoing objects are among those attained by the invention, which provides methods and apparatus for guiding and/or switching vehicles and other objects by magnetically guiding a guide plate, e.g., attached to the vehicle or coupled to its steering systems, over a guideway.

More particularly, one aspect of the invention provides a system for vehicle guidance including a guideway, a guide plate that moves along the guideway, and a magnetic field source that induces an attractive magnetic force between the guide plate and at least a portion of the guideway over, under or otherwise near the guide plate. The magnetic force has at least a passive component that opposes lateral deviation of the guide plate from a direction of motion defined by the guideway. That passive component is exerted without the need for feedback or other control and even in the absence of motion by the guide plate in the direction of motion established by the guideway. Thus, for example, the magnetic force opposes lateral deviation from the guidepath, regardless of whether the guide plate (and the vehicle to which it is attached) are moving, e.g., at 0.5 or 500 miles per hour. Moreover, no additional power is required to produce that passive component (apart from the nominal power requirements of an electromagnet included in the guideway or guide plate).

The magnetic field source is a permanent magnet, an electromagnet (including a superconducting magnet) or any other known magnetic field source. It may be included in, or form part of, the guide plate—though it can be included in, or form part of, the guideway itself The guide rail preferably comprises a ferromagnetic or paramagnetic material, i.e., a material that attains magnetic properties in the presence of the magnetic field of the source. Thus, for example, one aspect of the invention provides a system of vehicle guidance in which a vehicle-mounted guide plate comprises an arrangement of permanent magnets that move over a ferromagnetic, e.g., steel, guideway rail.

In alternate aspects of the invention, it is the guideway that incorporates a magnetic field source, while the guide plate incorporates a ferromagnetic or paramagnetic material. Thus, for example, the guide plate can comprise a ferromagnetic or paramagnetic material that moves over a permanent magnet, electromagnet or other magnetic field source in the rails. In still other aspects, both the guideway and guide plate incorporate magnetic field sources, e.g., permanent or electromagnets.

According to one aspect of the invention, the guide plate is attached or otherwise coupled directly to the vehicle. As the vehicle deviates laterally from the path defined by the guideway, the guide plate does likewise. The restorative force induced by the magnetic field to correct the path of the guide plate is likewise transmitted to the vehicle, via its coupling to the guide plate, thus correcting the path of the vehicle, as well.

Related aspects of the invention are particularly suited to guidance of steered vehicles. Here, the guide plate is coupled to the steering mechanism, as well as—or in lieu of—the vehicle itself According to this aspect of the invention, as the guide plate deviates from the path defined by the guideway, a corrective force is coupled to the steering mechanism (as well as to the vehicle itself) to facilitate redirection. Thus, for example, a guide plate can be affixed to a pin, gear, or other such structure on which the wheels of a vehicle pivot. If these magnets begin to fall out of line with the guideway path, the corrective force pivots the pin, gear, or other such structure, thereby causing the wheels to pivot and the vehicle to realign with the guidepath.

Further aspects of the invention provide a system as described above which additionally provides for vehicle switching. Such a system includes, in addition to the elements mentioned above, a second guideway that diverges from the first. As the moving guide plate crosses the point of divergence, or "switching" point, it follows the second guideway, e.g., if the magnetic force between it and the plate is greater than the magnetic force between the first guideway and the plate. Otherwise (depending on the geometry of the divergence point and on inertia), the guide plate simply continues to follow the first guideway.

In related aspects of the invention, the relative magnetic forces exerted by the first and second guideways on the guide plate are controlled by selectively boosting (or attenuating) the magnetic field associated with either of the guideways, e.g., using an electromagnet or using mechanical means to raise (or lower) either of the guideways and, thereby, to increase (or decrease) the respective magnetic force.

Still further aspects of the invention provide systems of the type described above in which the guide plate and guideway have magnetic poles that are disposed in opposing physical relationship to one another and that are of opposing magnet polarities.

The poles can be inherent in the materials selected for the components, e.g., as in the case of a guide plate that is formed from a permanent magnet or that includes an electromagnet. Alternatively, they can be induced in the components, e.g., as in the case of a guideway includes ferromagnetic or paramagnetic materials under the influence of a magnetic field.

In related aspects of the invention, the opposing poles of the guide plate and guideway do not physically touch but, instead, are separated by a small gap, e.g., of air or other gas, fluid, or particulate matter that does not unduly attenuate the magnetic flux or restrict movement of the guide plate with respect to the guideway.

The magnetic field flux passing between the opposing poles is focussed, in accord with further aspects of the invention, to minimize flux leakage and maximize the lateral corrective forces between the plate and guideway. This can be accomplished by providing ferromagnetic or paramagnetic tips, e.g., on permanent magnets forming the poles of the guide plate.

Related aspects of the invention provide a system as described above in which the guide plate has a pair of poles that are disposed in physically opposing relationship to, and of opposite polarity from, a corresponding pair of poles on the guide way. According to this aspect of the invention, the poles on the guide plate are of opposite polarity from one another. Thus, for example, two poles on a guide plate can be formed from respective permanent magnets, one having its "north" pole facing the guideway, the other having its "south" pole facing the guideway.

Still further related aspects of the invention provide systems as described above in which the spacing between the paired poles of the guide plate differs from that of the corresponding paired poles of the guideway. According to one preferred aspect of the invention, for example, the spacing between the poles of the guide plate is slightly greater than a spacing between the corresponding poles of the guideway. Such spacings can enhance the restorative magnetic forces between the guide plate and the guideway.

In instances where the poles of the guide plate or guideway are formed from magnetic field sources, e.g., permanent magnets, further aspects of the invention provide for inclusion of a ferromagnetic material or paramagnetic material between those poles of the magnets that do not comprise a pole of the guide plate. Thus, for example, where the north and south poles, respectively, of two permanent magnets form the poles of a guide plate, the south and north poles, respectively, of those magnets can be magnetically coupled by steel or iron, e.g., to close a flux loop and, thereby, enhance magnetic field strength.

Still other aspects of the invention provide systems of the type described above in which the guide plate comprises a magnetic field source and in which the guideway comprises a ferromagnetic or paramagnetic material with poles formed from ends disposed in opposing physical relationship to the corresponding poles of the guide plate. The guideway, for example, can be formed in a U-shaped channel from a solid ferromagnetic strip or, preferably, from a laminated strip, e.g., to minimize eddy currents. In further embodiments, the poles can have cross-sections that decrease at those ends which are disposed in opposing physical relationship to the corresponding poles of the guide plate.

Yet still other aspects of the invention provide systems of the types described above for guidance of objects other than vehicles. In one such aspect, the invention provides a shaftless flywheel, e.g., for energy storage, wherein a guide plate and guideway are used to maintain alignment of the wheel. The guide plate comprises, for example, a circular length of paramagnetic or ferromagnetic material that is mounted on the flywheel. A circular rail comprising a permanent magnet, electromagnet or other magnetic field source is mounted on an opposing surface of the housing in which the flywheel rotates. When the wheel is fully aligned, no net lateral magnetic forces are exerted between the guide plate and rail. However, should the wheel begin to precess or otherwise deviate from alignment, a lateral force between the guide plate and rail tends to realign the flywheel. In related aspects, the magnets on the guide plate are arranged so as to provide a force for at least partially suspending the flywheel, e.g., against the force of gravity.

Yet still other aspects of the invention comprise methods for guiding a vehicle that parallel the operation of the systems described above.

Systems constructed in accord the invention have numerous advantages over the prior art. For example, since the corrective force effected by the magnetic field between the guide plate and guideway does not depend on friction, reliable guidance can be accomplished without physical contact, or when there is insufficient friction to provide guidance, such as an automobile on an icy road. Moreover, such systems can be constructed without any movable parts on either the vehicle (or other object) or the guideway and, thus, can be readily applied to applications requiring low headway.

The foregoing and other aspects of the invention are evident in the drawings and in the description that follows:

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Introduction

Figure 1:
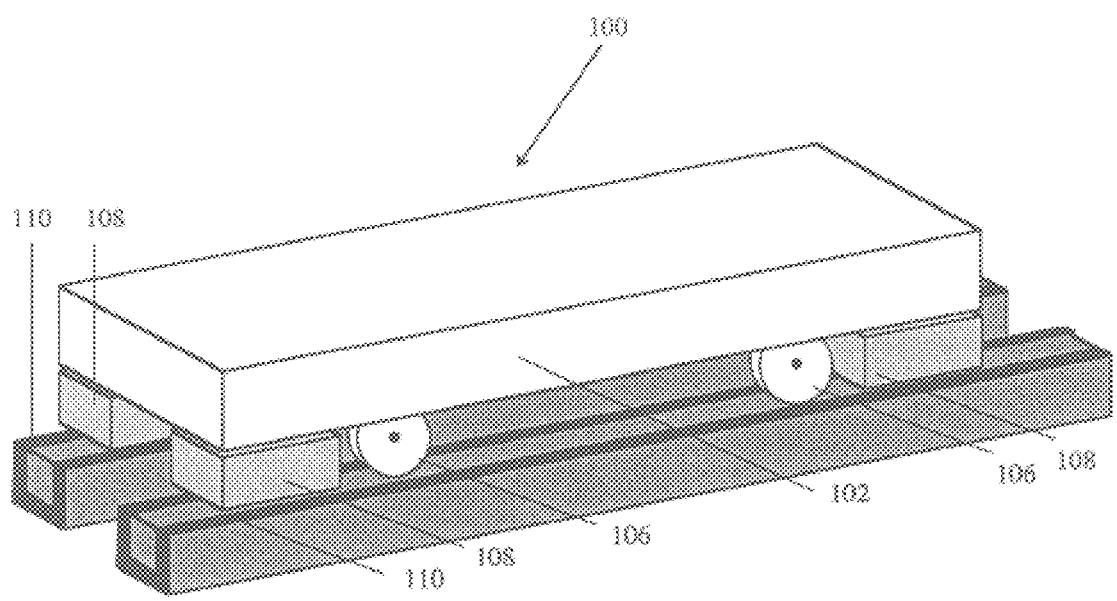
FIG. 1 depicts a vehicle guidance system according to the invention.

As shown in the drawings and discussed below, the invention utilizes magnetic forces for guiding vehicles (and other objects) in motion on a guideway and/or for diverting or merging vehicles at switch points on the guideway. The guidance is achieved by the interaction of magnetic field produced by the guide plate—or, in the illustrated embodiment, by the vehicle itself (to which the guide plate is affixed)—with ferromagnetic strips running the length of the guideway. Although it can be supplemented with feedback-based or other active components, the magnetic guidance provided by the invention can be entirely passive. Thus, for example, the restorative force between the guideway and the guide plate can be exerted without control circuitry that might otherwise serve to increase (e.g., the magnetic field) and regardless of the relative speed of the plate along the pathway defined by the guideway.

One factor in various ones of the illustrated embodiments to achieving passive guidance utilizing magnetic forces is to have a magnetic field on the vehicle that is focused into a small region above relatively narrow ferromagnetic rails on the guideway. There can be any number of rails, but one to four will suffice for many group rapid transit, personal rapid transit and material handling applications. Such guidance rails will typically be paired so as to provide a round trip path for the vehicle's magnetic flux through the guideway rails and back to the vehicle. This efficient magnetic structure allows modest sized vehicle magnets and guideway rails to produce strong magnetic forces. The interaction of the magnets with the rails can provide sufficient lateral forces on the vehicle to keep the vehicle from leaving the guideway on turns and when it is subjected to external forces.

A guidance system must be able to steer vehicles into one of two or more paths on diverging guideways and also be able to merge vehicles that are converging from different directions. When mechanical guidance is used this entails the use of mechanically movable parts on either the vehicle or the guideway. With magnetic guidance switching can be accomplished without any moving parts. As discussed below, in certain embodiments of the invention electromagnets are located on the guideway at switch points and they produce magnetic fields that can be rapidly changed to allow closely spaced vehicles to merge or diverge without risk that mechanical failure will produce accidents. Such switches can be designed to be fail safe so that if the switching magnets fail the vehicles will merge safely at points of merger or continue straight at points of diversion.

Guidance

FIG. 1 illustrates a wheeled vehicle constructed in accord with the invention. The vehicle 100 comprises a chassis and body 104 for holding persons, cargo or other materials to be transported. Although the illustrated body 104 is a platform, those skilled in the art will appreciate that other person- or cargo-carrying configurations can be utilized as well. The illustrated vehicle 100 is "suspended" by wheels or coasters 106 which roll over a surface including guideways 110, as shown. The surface can be a roadway, floor, rails or other surface(s) suitable for supporting the wheels 106 and vehicle 100. Those skilled in the art will appreciate that the invention can be applied to non-wheeled vehicles, as well. Thus, for example, suspension can be provided by an air cushion (e.g., over land or water), by fluid "lift" (e.g., as in the case of an airplane or helicopter), by magnetic levitation, or otherwise. Propulsion for vehicle 100 can be provided by any known propulsion source, e.g., motorized wheels (e.g., as in the case of an automobile), force from an external source (e.g., as in the case of railroad cars), gravity (e.g., as in the case of a rollercoaster), and linear motor (e.g., as in the case of a magnetically propelled vehicle).

Guide plates 108 are coupled to vehicle 100 and, optionally, to its steering mechanism, to guide its motor along guideways 110. Though only a single guide plate and guideway need be provided, the illustrated vehicle 100 is guided by four fore-and-aft guide plates that travel over two guideways 110, as shown. Among the components of a guidance system used in practice of the illustrated embodiment are a source of magnetic field on guide plates 108, e.g., attached to the vehicle 100, and ferromagnetic rails on the guideways. Though the guide plates 108 (and their accompanying magnets) are shown on the outside of the wheels, they could be on the inside as well. In this example the wheels 106 are designed to have low friction with the running rails and do not contribute to the steering.

Figure 2:
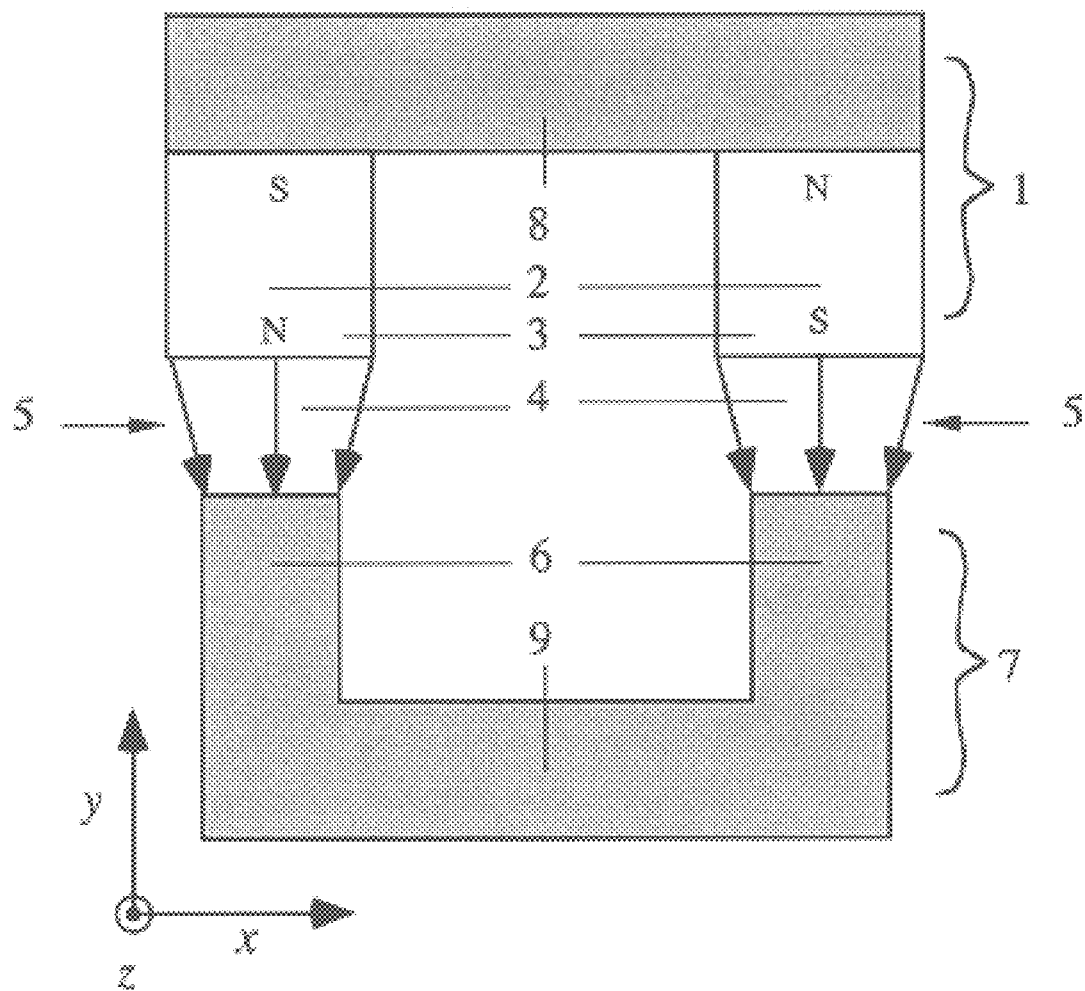
FIG. 2 depicts a guide plate and guideway used to induce a corrective magnetic guidance force in a system according to the invention.

FIG. 2 is a cross section view of a guide plate 1 and guideway 7 (corresponding to elements 108 and 110 of FIG. 1) according to one practice of the invention. In this embodiment, the guide plate 1 has two rows of permanent magnets 2 running longitudinally in the direction of vehicle travel, as defined by the guideway 7 and, particularly by its rails 6. That direction of travel is indicated by axis z. The magnets of the guide plate can be magnetized as shown with N designating a north pole and S designating a south pole. The magnets 2 produce a strong magnetic field in narrow regions 4, e.g., air gaps between the rows of permanent magnets 2 and the ferromagnetic rails 6 on the guideway 7. The permanent magnets 2 are connected by a ferromagnetic member 8, while the two guideway rails 6 are connected by a similar member 9 so as to complete a magnetic circuit and allow magnetic flux to circulate from one row of the vehicle magnets 2 through the guideway rails 6 and back to the other row of vehicle magnets 2.

Figure 3:
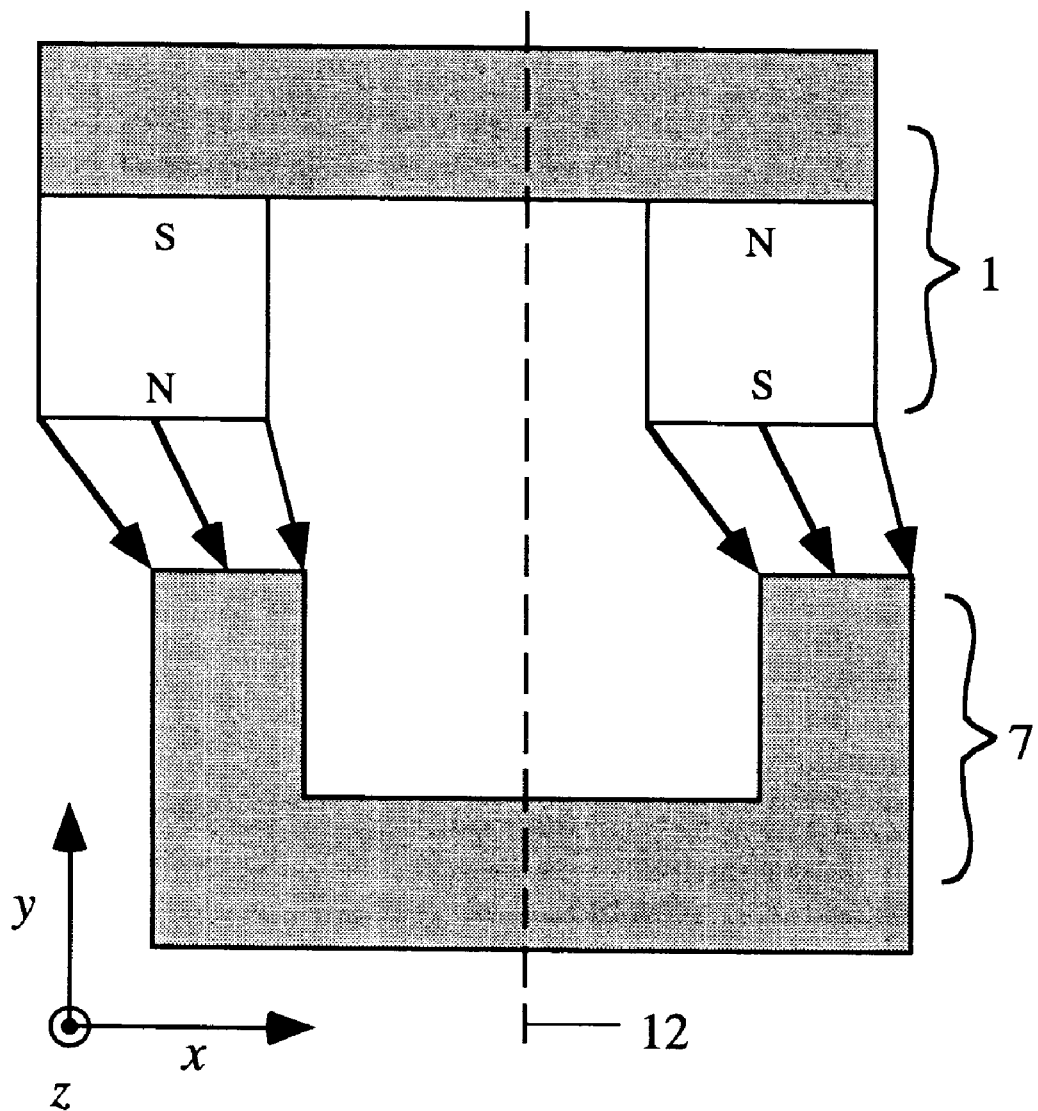
FIG. 3 illustrates the corrective magnetic forces induced in the guide plate and guideway of FIG. 2 when the guide plate strays laterally from equilibrium, i.e., from the pathway defined by the guideway.

In FIG. 2 the magnetic forces 5 arising between the guide plate 1 and guideway 7 are indicated by arrows. In the equilibrium or centered position shown in FIG. 2, there is no net lateral force 5 between the guide plate and the guideway, i.e., no net force along an axis x perpendicular to the direction of motion defined by the guideway 7. The only net force is a downward force along axis y attracting the vehicle to the guideway. In this condition, the vehicle is in a state of equilibrium with respect to lateral motion. If the guide plate 1 moves laterally, i.e., to one side of the center of the guideway 7, such as shown in FIG. 3, then there is still both downward force, but now there is a net lateral force 5 to one side. In short, the magnets 2 and ferromagnetic rails 6 have created a centering force that tends to push the vehicle towards the centered (or other equilibrium) position shown in FIG. 2.

Figure 4:
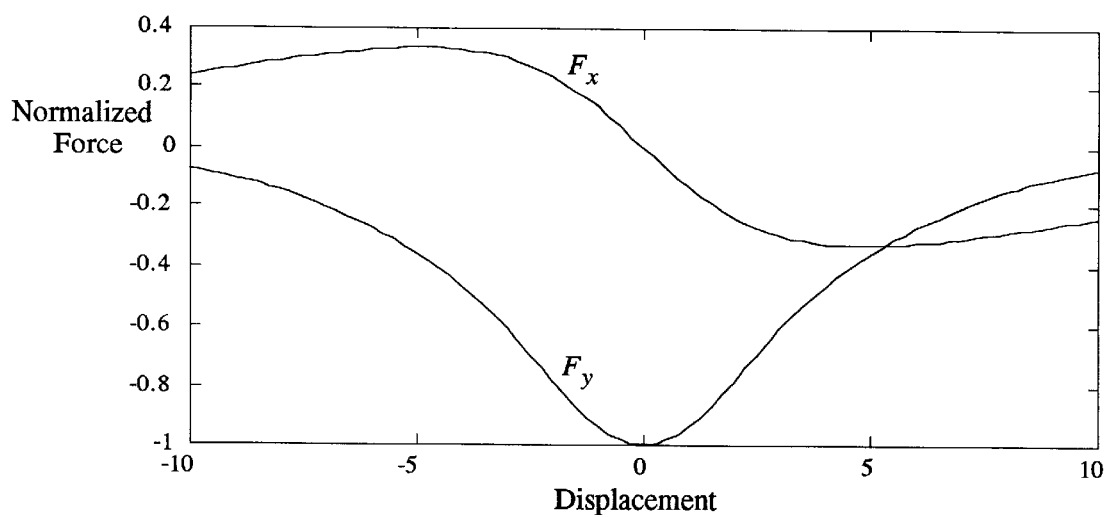
FIG. 4 illustrates the corrective forces produced in the directions of the x- and y-axes as a function of lateral displacement for a guide plate and guideway of the type shown in FIG. 2.

FIG. 4 shows typical plots of $F_x$ and $F_y$ as functions of the lateral displacement x, of the guide plate from the centerline 12 (or other equilibrium position) of the guideway. In FIG. 4 the forces are normalized so the downward force has unit magnitude and one unit of distance in the x direction is equal to the width of the poles, which is assumed to be approximately equal to the length of the gap 4 between magnets 2 and guideway rails 6. In a typical design the maximum downward vertical force is about 4 times larger than the maximum lateral force. Near equilibrium the magnetic force acts exactly as though there were symmetrically located springs between the sides of the guide plate and the guideway. In the equilibrium position there is no net spring force, but when the guide plate deviates from the equilibrium position there is a spring-like restoring force. For small displacements the spring force is proportional to the displacement from equilibrium, similar to the behavior of a conventional mechanical springs; this is indicated by the linear relation between $F_x$ and x near x=0 in FIG. 3. This "magnetic spring" plays a significant role in guidance.

The Guide Plate and Guideway

Figure 5:
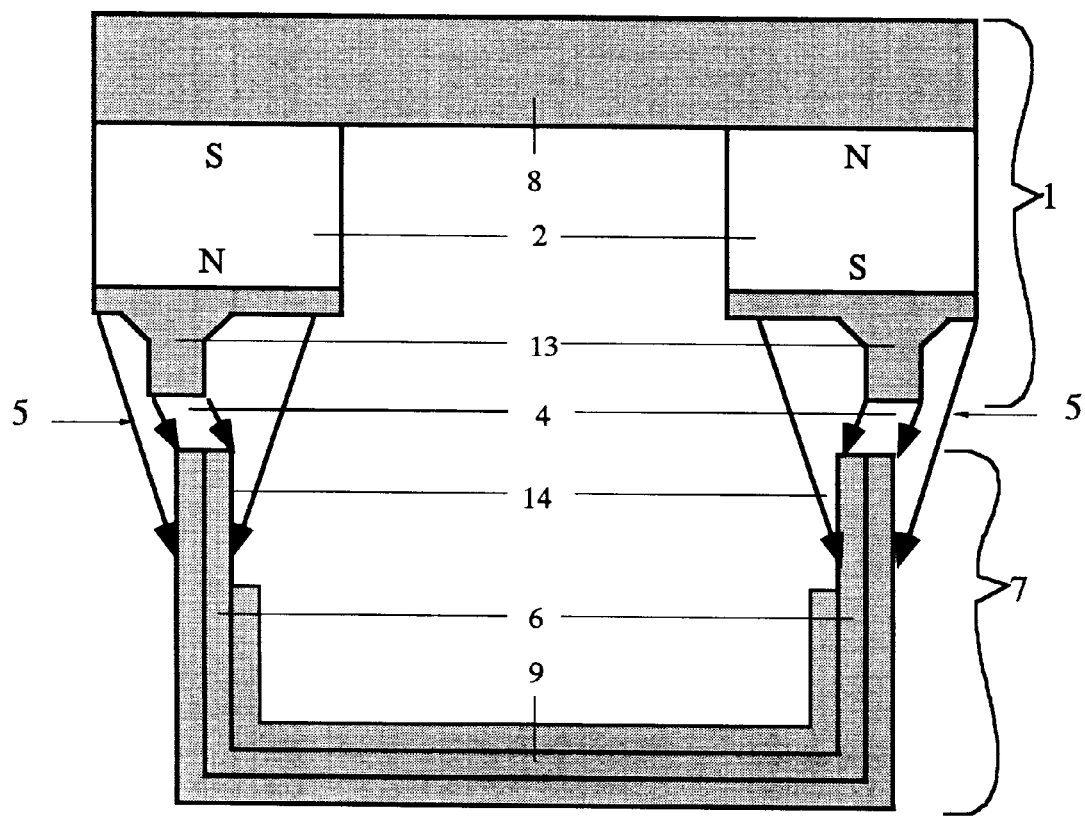
FIG. 5 depicts alternative structures and arrangements of the guide plate and guideway of FIG. 2.

The structures shown in FIG. 2, using commercially available permanent magnets 2, produce usable flux on the order of 0.6 Tesla. FIG. 5 depicts an embodiment that concentrates the flux in the gap region 4 and, thereby, achieves higher performance. In this embodiment, high permeability pole tips 13 are mounted below the permanent magnets 2 so as to cause the flux in the air gap 4 to be about 3 times as great as it would be without the poles tips. Since the guidance force varies as the square of the flux density in the gap, this produces a significantly higher guidance force for a given weight and cost of the magnetic structure. Of course, those skilled in the art will appreciate that gap 4 (as illustrated here and throughout) need not be filled with air but, rather, can contain any other fluid or medium that does not unduly attenuate the magnetic flux and that does not unduly restrict movement of the guide plate relative to the guideway.

Another improvement shown in FIG. 5 is the lamination of the ferromagnetic guideway rails. The guideway 7 is constructed from laminated steel (or other ferromagnetic or paramagnetic) strips so as to minimize drag forces produced by eddy currents in the guidance rails 6. The lamination also prevents the loss of guidance at high speeds due to repulsive forces created by eddy currents in the guidance rails. In some cases this lamination may be unnecessary, such as when the maximum operational speed is relatively slow or the guidance rails are relatively narrow. In some cases, such as shown in FIG. 5, it is preferable to provide more laminations in the lower or base portion of guideway 7 than in the upper or rail portions. This minimizes problems with magnetic saturation where the magnetic fields are the strongest.

Another feature of the design in FIG. 5 is the slight offset of the guide plate poles 13 relative to the opposing poles 14 of the guideway rails 6. This accomplishes two goals: it reduces the leakage flux between the two rows of vehicle magnets 2 and it decreases the downward attractive force between the guide plate 1 and the rails 6. The guidance force is reduced less than vertical force is reduced, so the ratio of the two forces is reduced and the magnitude of the ratio of $F_y$ to $F_x$ can be reduced to 4 or even slightly less. If reduced downward force is not required, then the poles 13, 14 can be aligned.

Figure 6:
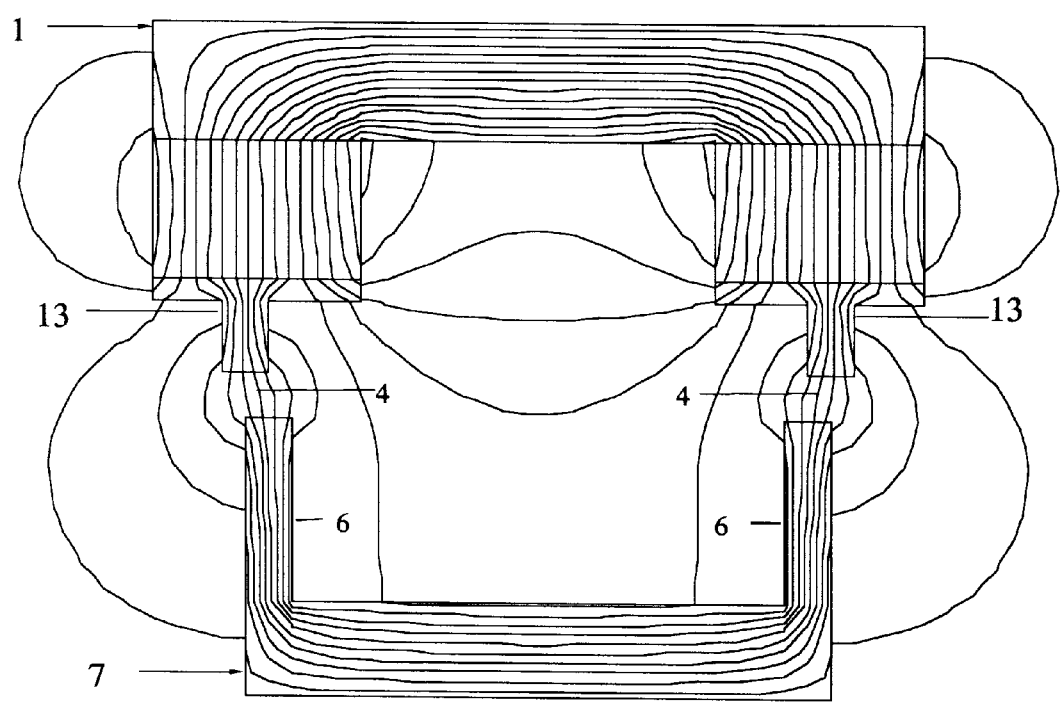
FIG. 6 illustrates magnetic flux lines between and within the guide plate and the guideway in the embodiment shown in FIG. 5.

FIG. 6 shows a magnetic flux plot is for a preferred arrangement of a guide plate and guideways. A preferred choice is to make the pole tips 13 approximately the same width as the air gap 4 length, and to concentrate the flux enough to provide nearly saturation flux in a guideway rails 6. The force plots shown in FIG. 6 were computed for a configuration as described below. For purposes of the illustration, the magnets 2 are Neodymium-iron-boron, which provide a working flux density in the permanent magnets of about 0.5 Tesla. Assuming steel guidance rails 6 on the guideway 7, a good design value of peak air gap flux is 1.5 Tesla. Hence the pole tips 13 are designed to concentrate the permanent magnet flux by about a factor of 3, Since the peak field is not at the pole tips, the actual flux density in the pole tips is only about 1 Tesla.

To further understand the foregoing, it will be appreciated that the attractive force on a ferromagnetic surface is given by:

$F=B^2/2\mu$ per unit area

For B=1 Tesla, $F=0.3979 \cdot 10^6$ N/m$^2$=58.8 psi

To a first approximation we can assume that this is the force per unit area on the guide plate pole tips 13. For this example assume that the pole tip flux is 1 Tesla and each of a pair of guidance rails is 2 mm wide; then the vertical force is $F_y=-4 \cdot 1^2 \cdot 0.4=-1.6$ N per mm of length of the pair of guidance rails. The maximum guidance force is then about $F_x=0.25|F_y|=0.4$ N per mm of length. If a vehicle has 4 guidance modules, each 100 mm long, then the maximum guidance force on the vehicle is about 160 N=36 pounds. The downward vertical force is 4 times the peak guidance force, or about 144 pounds. If all of the dimensions were doubled, then the areas would increase by a factor of 4 and the flux density would stay constant, so the force would be 4 times as large. If the air gap length is about the same as the pole width, then the peak guidance force will occur when the vehicle displacement from the centerline is a little more than the air gap length and the shape of the force displacement curve will be similar to that shown in FIG. 4.

Parameters in this design can be changed in ways that will be evident to those skilled in the art of designing permanent magnet structures. The details of the design might depend on whether the main effort is to: reduce cost of the vehicle guidance components, reduce cost of the guideway rails, reduce vehicle weight, reduce downward force, etc. As will be appreciated, a system according to the invention can achieve enough force, and a force which changes rapidly enough with lateral displacement, to reliably guide a variety of vehicles.

Steering Wheeled Vehicles

For wheeled vehicles it is critical to arrange for the wheels to be steered in the right direction in a stable manner. The simplest approach is to lock the wheels in a fore-and-aft position and use wheels that have relatively low friction with the guideway so that the magnetic forces can force the vehicle to follow the guideway, even when some amount of dragging is necessary. While simple, this method produces scrubbing action of the wheels on the guideway when turning corners and is not a recommended approach except on straight guideways.

Another solution for small vehicles is to use castors and let the castors pivot so as to trail the direction of motion. If operation is restricted to a single direction, then the castors do not have to pivot very much and this is a good solution. If two directions of travel are required, then the guideway running surface must be widened everywhere that the vehicle is required to be able to switch directions so that the castors can pivot as needed.

Still another method of steering a wheeled vehicle is to couple the guide plate directly to pivotable wheels so that they are always pointed in the correct direction. The design problem is to find a way to do this that is simple and reliable and allows stable operation in both directions. An approach according to one practice of the invention is shown in FIGS. 7A and 7B, which show front and side views, respectively, of a wheeled steering mechanism 18 configured according to the invention for steering a vehicle (not shown).

Figure 7A:
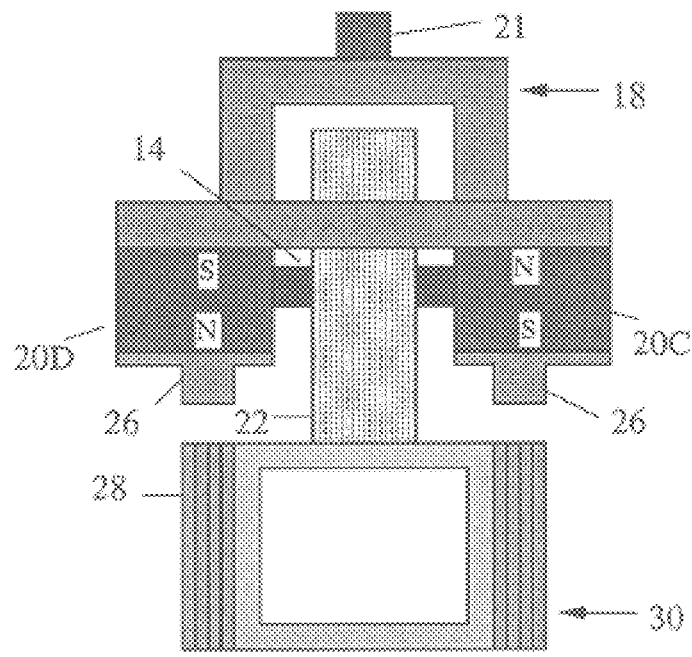
FIGS. 7A and 7B illustrate a mechanism for coupling guide plates to the steering mechanism, to wit, the pivotable wheels of a vehicle, in a system according to the invention.
Figure 7B:
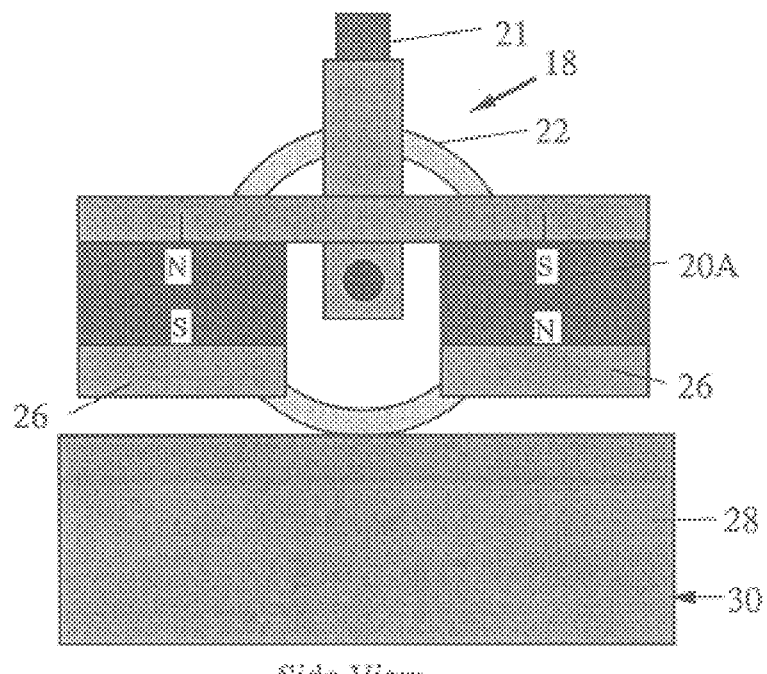

As shown in FIGS. 7A–7B, the wheel 18 is equipped with four guidance magnets 20A–20D, one at each corner of steering mechanism 18 structure that pivots on a vertical axle 21. The magnets 20A–20D are rigidly attached to a bearing which supports an axle 24 of a wheel 22 which is centered in pivoting structure 18. The guidance magnets 20A–20D have field focusing poles 26 which produce strong guidance forces that tend to align the magnets with the laminated guidance rails 28 in the guideway, as described above. In FIG. 7 the guideway 30 is a box beam having a substantially non-magnetic core supporting the guidance rails 28 in place, though other support structures are possible. Preferably that the wheel 22 does not have ferromagnetic parts that adversely affect the magnetic guidance.

The magnetic guidance system of FIGS. 7A–7B use vertical guidance rails 28 without a ferromagnetic element to carry the return flux. In this design, the return flux is carried longitudinally in the guidance rails 28 between the fore and aft guidance magnets 20A–20D. This approach may produce somewhat higher eddy current loss in the guidance rails 28, but these losses are not normally very high and there may be an offsetting cost advantage and, if necessary, thinner laminations can be used. Of course, a lateral return flux path can also be utilized, e.g., of the type shown in FIG. 5. If magnetic switching is to be used, then it is imperative to use a lateral return flux path and the magnetic flux directions should be the same on one side of the wheel and opposite to that on the other side.

It will be evident to those skilled in the art that there are other ways to couple the magnetic forces to the wheels so as to effect steering. For example, if the vehicle primarily goes in one direction it is possible to modify the design of FIGS. 7A–7B by moving the pivot point slightly forward and restricting the amount of pivot to only a few degrees. This will improve the steering stability for forward motions at the expense of stability for reverse motion. However, slow speed reverse motion would still be possible and this may be a preferred solution. If desired more complex linkages can be added and active steering via feedback control may be desirable at very high speeds.

Switching

In order to switch a vehicle employing a guidance mechanism according to this invention, it is necessary to be able to change the guidance force. This can be done by mechanical means, such as lowering a section of guideway so as to increase the air gap (and, thereby, decrease the magnetic restorative force). It would take very little motion to effect a major change in force, so the mechanical motion could be done in a fraction of a second. However, it is preferable to perform the switching without moving parts. A preferred method is to add a mechanism that uses magnetic forces to control the direction of motion.

Figure 8:
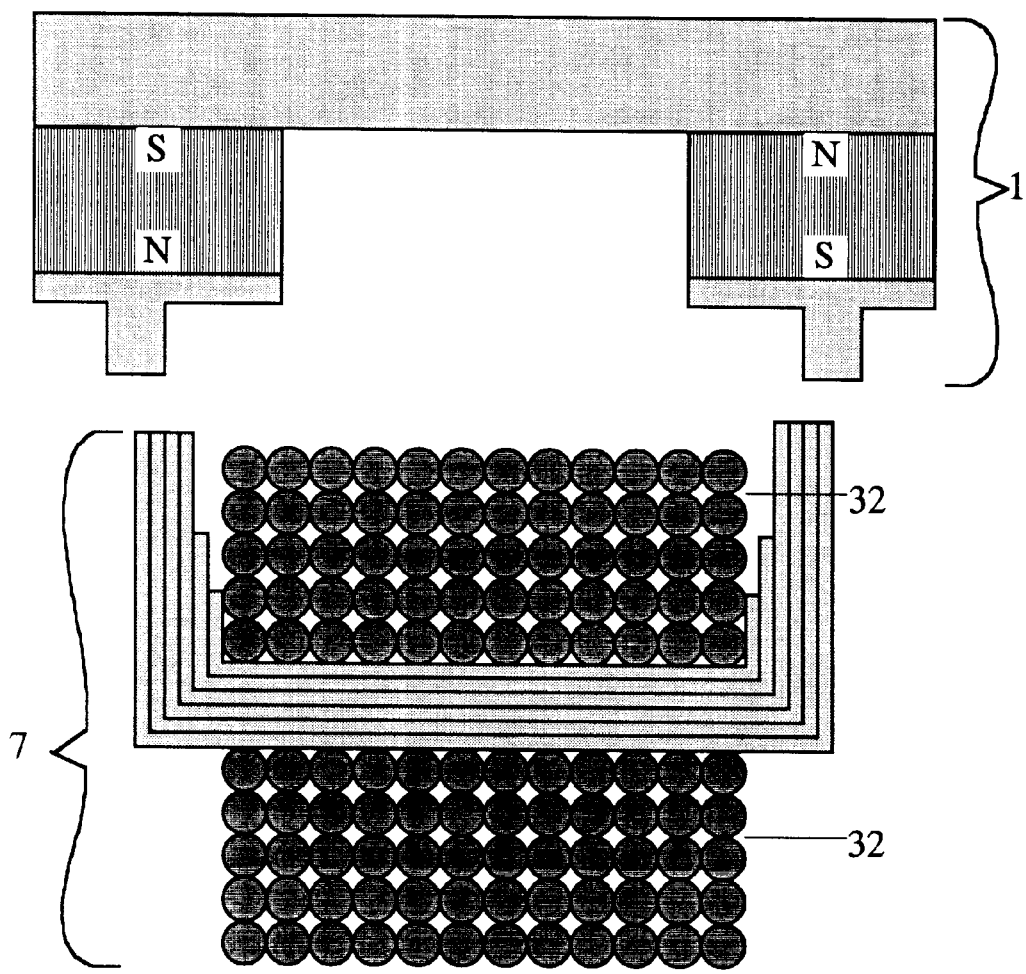
FIG. 8 depicts the use of electromagnetic coils in a guideway to vary the magnetic force between it and a guide plate in a system for vehicle guidance and switching according to the invention.

FIG. 8 shows one embodiment according to the invention for altering the guidance force via electromagnetic means. In this figure, a coil 32 is added to the guideway rail structure. Depending on the polarity of the current in this coil, the restorative forces between the guide plate and the guideway can be increased or decreased by increasing or decreasing the magnetic field in the gap.

Figure 9A:
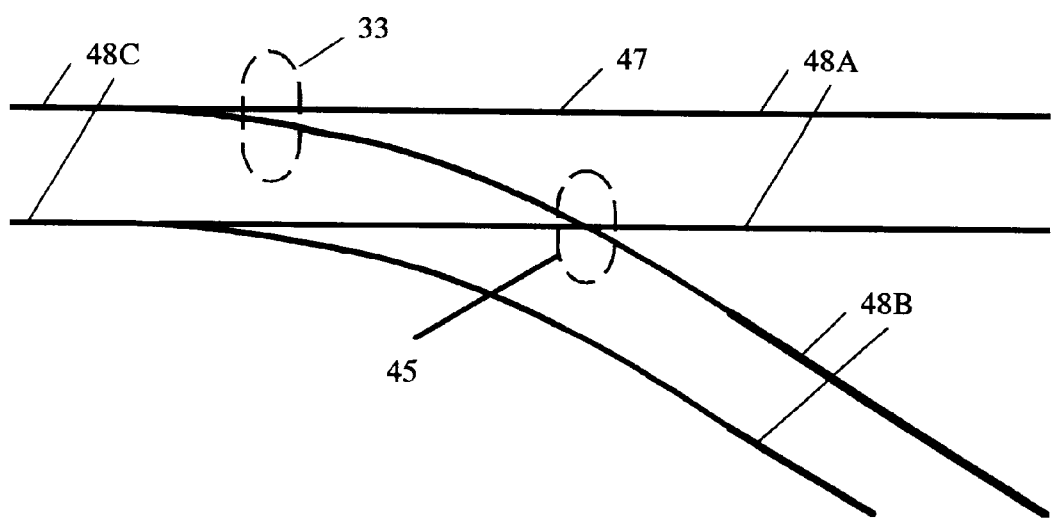
FIGS. 9A–9B illustrate an alternate embodiment of the invention in which a pair of guideways provide for switching of a vehicle.
Figure 9B:
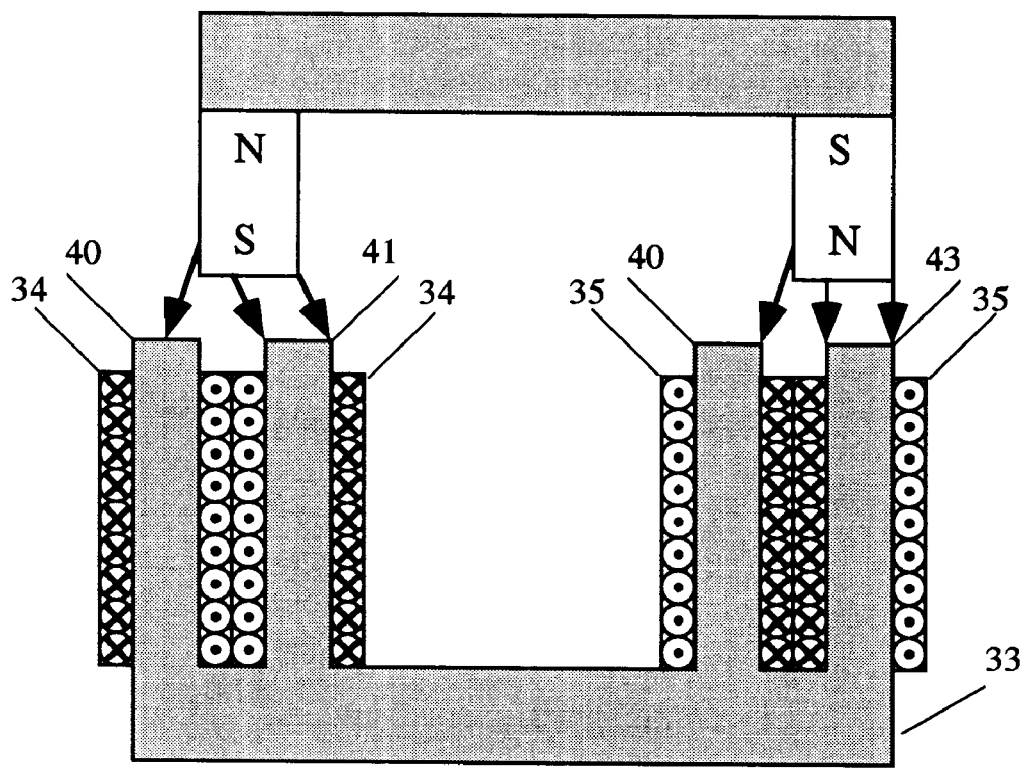
Figure 10:
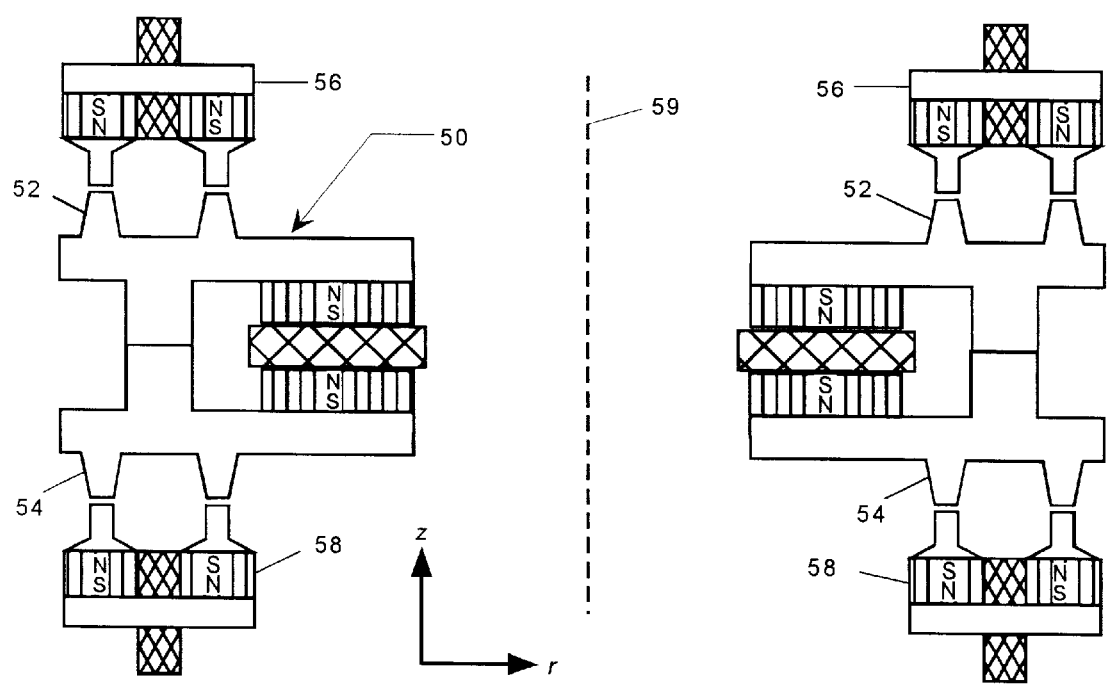
FIG. 10 depicts a mechanism according to the invention for controlling the radial position of a flywheel.

An alternate magnetic switching structure is shown in FIGS. 9A–9B. Here the switching is actuated by a pair of figure-8 coils that can cause the flux to switch between adjacent poles. Referring to FIG. 9A, a vehicle entering the switch 33 from the left has a choice of continuing straight or turning right. If coils 34, 35 of FIG. 9B are energized with the current polarity shown in FIG. 9B, then poles 41, 43 will have higher magnetic fields than poles 40, 42 and the vehicle will turn right. If the opposite current polarities are used, then the vehicle continue straight. Note that it is possible for the guidance rails to cross at 45 without major change in the guidance forces.

FIG. 9B shows how the mechanism of FIG. 9A is installed on a guideway 47 so as to control switching. In this FIG. 9A each line is a pair of guidance rails; the running surface for the wheels is not shown. Before a guide plate-equipped vehicle enters the switch 33 in the left part of FIG. 9A, and after the vehicle has passed through the switch, it is guided by two pairs of passive guidance rails, one on either side of the vehicle. For a vehicle moving from left to right in the drawing, it is desirable to be able to control direction so that the vehicle follows either the left guidance rails 48A or the right guidance rails 48B. This is accomplished by adding electromagnetic coils to the portions of the guidance rails that are drawn heavier in FIG. 9B. If the vehicle is to be diverted to the right, the force in guidance rails 48B is strengthened, the force in guidance rails 48A is weakened, and the vehicle moves to the right. If it is desired to continue straight then the force in guidance rails 48A is strengthened and the force in guidance rails 48B is weakened.

Once the vehicle passes through the switch 33 it is guided by passive guidance rails, but for a portion of the switch there is only one pair of rails guiding portions of the vehicle. However, the vehicle is usually longer than the missing portions of the guidance rails, so some of the guidance modules on the vehicle will have force from two pairs of guidance rails. and the system is designed to have sufficient force to insure reliable operation. Note that passive guidance rails can cross, as shown at position 45 in FIG. 9A. Also, because this is a flat guidance system, it is possible for the wheels to cross the guidance rails without interference. One possibility is to use a stainless steel or titanium plate to cover the guidance rails in the crossing area so that the wheels have a smooth running surface and the covering plate does not interfere in a significant way with the magnetic fields; these materials are nonmagnetic and have relatively high resistivity so a thin plate is acceptable.

If neither the left or right electromagnets are actuated the vehicle's inertia is large enough that the vehicle would follow the straight path. This provides a fail safe feature in the event of failure in the electromagnetic actuation system.

The switch 33 FIG. 9A can also be used to automatically merge two lanes of traffic into one. In this case streams of vehicles would be moving from right to left following either guide rails 48A or 48B. In this case there is no need to activate the switch electromagnets because both streams of vehicles will automatically end up following rails 48C. Of course it is still possible to activate the switching electromagnets if the added force is deemed to be desirable, but with a well designed system this should not be necessary, thereby providing fail safe operation.

Guiding Objects Other Than Vehicles

The guidance mechanisms described herein can be used to guide structures other than vehicles. Thus, for example, as described below they can be used to steer or guide a magnetically suspended vehicle or rotating structure. FIG. 11 shows a flywheel with such a magnetic guidance structure at both the top and bottom. In this case the vertical force associated with the guidance force is used to suspend the wheel in a nearly lossless manner.

Specifically, the drawing shows a flywheel 50 having guide plates 52 and 54 integral to top and bottom rotating surfaces of the flywheel 50, as shown. The guide plates 52, 54 are preferably comprised of circular ferromagnetic or paramagnetic sections disposed concentrically to the surface of the flywheel 50 and centered about its axis of rotation 59. More particularly, the guide plates 52, 54 are constructed in the manner, e.g., of the guiderail 7 shown in FIG. 5. Guideways 56, 58 are placed on inner surfaces of the cavity in which the flywheel 50 is disposed in opposing relationship to the guide plates 52, 54, as shown. The guideways 56, 58 preferably comprise structures constructed in the manner of the guide plate 1 shown in FIG. 5, albeit configured in a circular section substantially mirroring in shape and pathway of guide plates 52, 54 when the flywheel is fully aligned.

A vertical stabilizing system, not shown, counteracts the inherent instability of the magnetic suspension so as to make the flywheel stay in an equilibrium position that requires no steady state power. For operation in a gravitational filed that creates a downward force, the feedback control raises the wheel until it is nearer the upper guidance structure than the lower structure with a net upward magnetic force that exactly balances the gravitational force. It is possible to design a structure for which there is an equilibrium vertical position at a location that also allows enough radial guidance to keep the wheel centered: the equilibrium is stabilized by the feedback control system. In this case the magnetic guidance provides radial position control and replaces the shaft that would be used with a conventional bearing supported wheel.

An analogous configuration can be used to guide a magnetically suspended vehicle. In this case the guidance is provided by linear guidance rails and it may be unnecessary to have a lower guidance structure of the type shown in FIG. 11.

Although specific embodiments of the invention have been shown and described, it will be understood that other embodiments and modifications which will occur to those of ordinary skill in the art fall within the true spirit and scope of the invention as set forth in the appended claims.

What is claimed is:

1. A system for guidance of a vehicle, comprising
   a guideway,
   a guide plate for moving along the guideway,
   a magnetic field source for inducing an attractive magnetic force between the guide plate and at least a portion of the guideway in a vicinity of the guide plate,
   the magnetic force having at least a passive component that opposes lateral deviation of the guide plate from a direction of motion established by the guideway, even in the absence of relative motion by the guide plate in the direction of motion established by the guideway, and
   the guide plate adapted to be coupled to the vehicle for guiding a path of motion thereof.

2. A system according to claim 1, wherein at least one of the guideway and guide plate comprises the magnetic field source.

3. A system according to claim 1, wherein the magnetic field source comprises any of a permanent magnet and an electromagnet.

4. A system according to claim 3, wherein at least one of the guide plate and guideway comprise any of a permanent magnet, electromagnet, ferromagnetic material and paramagnet material.

5. A system according to claim 1, wherein
   the guide plate comprises the magnetic field source, which includes any of a permanent magnet and electromagnet, and
   the guideway comprises any of a ferromagnetic and paramagnetic material.

6. A system for guidance and switching of a vehicle, comprising
   a first guideway,
   a second guideway that diverges from the first guideway,
   a guide plate for moving along any of the first and second guideways,
   a magnetic field source for inducing a magnetic force between the guide plate and at least a portion of any of the first and second guideway in a vicinity of the guide plate,
   the magnetic force having at least a passive component that opposes lateral deviation of the guide plate from a direction of motion established by a respective one of the first and second guideways in which the guide plate is in the vicinity, even in the absence of relative motion by the guide plate in the direction of motion established by the guideway, and
   the guide plate adapted to be coupled to the vehicle for guiding a path of motion thereof.

7. A system according to claim 6, wherein the guide plate switches from moving along the first guideway to moving along the second guideway when magnetic force between the guide plate and the second guideway is greater than the magnetic force between the guide plate and the first guideway.

8. A system according to claim 7, wherein the second guideway comprises an electromagnet for selectively inducing a greater magnetic force between the guide plate and at least a portion of the second guideway than the magnetic force between the guide plate and the first guideway.

9. A system according to claim 7, wherein at least one of the first and second guideways is moved to induce a greater magnetic force between the guide plate and at least a portion of the second guideway than the magnetic force between the guide plate and the first guideway.

10. A system for conveyance, comprising
    a vehicle with a steering mechanism that determines a direction of motion of the vehicle,
    a guideway,
    a guide plate for moving along the guideway,
    a magnetic field source for inducing a magnetic force between the guide plate and at least a portion of the guideway in a vicinity of the guide plate, the magnetic force having at least a passive component that opposes lateral deviation of the guide plate from a direction of motion established by the guideway, even in the absence of relative motion by the guide plate in the direction of motion established by the guideway, and the guide plate being coupled to the steering mechanism to direct motion of the vehicle as a function of motion of the guide plate along the guideway.

11. A system according to claim 10, wherein the vehicle comprises one or more wheels, and the steering mechanism angles the wheels in order to at least partially determine a direction of motion of the vehicle.

12. A system according to claim 10, wherein the steering mechanism comprises a pivot, and wherein the guide plate is coupled to the steering mechanism for rotating the pivot in response to lateral deviation of the guide plate from the direction of motion of the guideway.

13. A system for guidance of a vehicle, comprising a guideway, a guide plate that moves along the guideway and that is adapted to be coupled to the vehicle for guiding a path of motion thereof, the guide plate and guideway having poles that are disposed in opposing physical relationship to one another and that are of opposing magnet polarities to one another, and the opposing poles of the guide plate and guideway giving rise to a magnetic force the magnetic force having at least a passive component that opposes lateral deviation of the guide plate from a direction of motion established by the guideway, even in the absence of relative motion by the guide plate in the direction of motion established by the guideway.

14. A system according to claim 13, wherein at least one of the guideway and guide plate comprises the magnetic field source.

15. A system according to claim 14, wherein the magnetic field source comprises any of a permanent magnet and an electromagnet.

16. A system according to claim 14, wherein a magnetic flux between the poles of guideway and guide plate is focussed.

17. A system according to claim 16, wherein the poles of at least one of the guideway and guide plate comprise tips of any of a ferromagnetic material and a paramagnetic material for focussing the magnetic flux.

18. A system for guidance of a vehicle, comprising a guideway, a guide plate that moves along the guideway and that is adapted to be coupled to the vehicle for guiding a path of motion thereof, each of the guideway and the guide plate comprising a pair of poles of opposing magnetic polarities to one another, each of the poles of the guide plate being disposed in opposing physical relationship to a corresponding pole of the pair of poles of the guideway and being of opposite polarity to that corresponding pole, the opposing poles of the guide plate and guideway giving rise to magnetic forces that have at least a passive component that opposes lateral deviation of the guide plate from a direction of motion established by the guideway, even in the absence of relative motion by the guide plate in the direction of motion established by the guideway.

19. A system according to claim 18, wherein a spacing between the poles of the guide plate differs from a spacing between the corresponding poles of the guideway.

20. A system according to claim 19, wherein the spacing between the poles of the guide plate differs from a spacing between the corresponding poles of the guideway.

21. A system for guidance of a vehicle, comprising a guideway, a guide plate that moves along the guideway and that is adapted to be coupled to the vehicle for guiding a path of motion thereof, each of the guideway and the guide plate comprising a pair of poles of opposing magnetic polarities to one another, the guide plate comprising a pair of magnetic field sources, one pole of each of which comprises a pole of the guide plate, each of the poles of the guide plate being disposed in opposing physical relationship to a corresponding pole of the pair of poles of the guideway and being of opposite polarity to that corresponding pole, the opposing poles of the guide plate and guideway giving rise to magnetic forces that have at least a passive component that opposes lateral deviation of the guide plate from a direction of motion established by the guideway, even in the absence of relative motion by the guide plate in the direction of motion established by the guideway.

22. A system according to claim 21, wherein at least one of the magnetic field sources comprises any of a permanent magnet and an electromagnet.

23. A system according to claim 21, wherein the poles of the guide plate comprise tips of any of a ferromagnetic material and a paramagnetic material for focussing a magnetic flux between those poles and the corresponding poles of the guideway.

24. A system according to claim 21, comprising any of a ferromagnetic and paramagnetic material for magnetically coupling those poles of the magnetic field sources that do not comprise a pole of the guide plate.

25. A system according to claim 21, wherein the guideway comprises any of a ferromagnetic and paramagnetic material.

26. A system according to claim 25, wherein the poles of the guideway comprise any of ferromagnetic and paramagnetic members having ends disposed in opposing physical relationship to the corresponding poles of the guide plate.

27. A system according to claim 26, wherein a cross-section of those members is decreased at the ends disposed in opposing physical relationship to the corresponding poles of the guide plate.

28. A system according to claim 21, wherein the guideway comprises a laminate of any of a ferromagnetic and paramagnetic material.

29. A system according to claim 28, wherein the laminate is formed with a pair of members having ends disposed in opposing physical relationship to the corresponding poles of the guide plate, wherein a cross-section of those members is decreased at the ends disposed in opposing physical relationship to the corresponding poles of the guide plate.

30. A system for guidance of a object, comprising a guideway, a guide plate for moving along the guideway, a magnetic field source for inducing an attractive magnetic force between the guide plate and at least a portion of the guideway in a vicinity of the guide plate, the magnetic force having at least a passive component that opposes lateral deviation of the guide plate from a direction of motion established by the guideway, even in the absence of motion by the guide plate relative to the guideway in that direction of motion, and the guide plate adapted to be coupled to the object for guiding a path of motion thereof.

31. A system according to claim 30, wherein at least one of the guideway and guide plate comprises the magnetic field source.

32. A system according to claim 30, wherein the magnetic field source comprises any of a permanent magnet and an electromagnet.

33. A system according to claim 32, wherein at least one of the guide plate and guideway comprise any of a permanent magnet, electromagnet, ferromagnetic material and paramagnet material.

34. A system according to claim 30, wherein the object is a flywheel.

35. A flywheel system comprising,
a guideway defining a substantially circular path,
a flywheel having mounted thereon a guide plate for moving along the guideway,
a magnetic field source for inducing an attractive magnetic force between the guide plate and at least a portion of the guideway in a vicinity of the guide plate,
the magnetic force having at least a passive component that opposes lateral deviation of the guide plate from a direction of motion established by the guideway, even in the absence of relative motion by the guide plate in the direction of motion established by the guideway.

36. A system according to claim 35, wherein at least one of the guideway and guide plate comprises the magnetic field source.

37. A system according to claim 35, wherein the magnetic field source comprises any of a permanent magnet and an electromagnet.

38. A system according to claim 37, wherein at least one of the guide plate and guideway comprise any of a permanent magnet, electromagnet, ferromagnetic material and paramagnet material.

39. A system according to claim 35, wherein the guideway is mounted in a housing in which the flywheel is disposed and in opposing relationship to the guide plate.

40. A system for guidance of a vehicle, comprising
a guideway,
a guide plate for moving along the guideway,
a magnetic field source for inducing an attractive magnetic force between the guide plate and at least a portion of the guideway in a vicinity of the guide plate, the magnetic field source comprising a permanent magnet,
the magnetic force having at least a passive component that opposes lateral deviation of the guide plate from a direction of motion established by the guideway, even in the absence of motion by the guide plate relative to the guideway in that direction of motion, and
the guide plate adapted to be coupled to the vehicle for guiding a path of motion thereof.

41. A system according to claim 40, wherein at least one of the guideway and guide plate comprises the magnetic field source.

42. A system according to claim 40, wherein at least one of the guide plate and guideway comprises a permanent magnet and wherein the other comprises any of a ferromagnetic material and paramagnet material.

43. A system for guidance and switching of a vehicle, comprising
a first guideway,
a second guideway that diverges from the first guideway,
a guide plate for moving along any of the first and second guideways,
a magnetic field source for inducing a magnetic force between the guide plate and
at least a portion of any of the first and second guideway in a vicinity of the guide plate, the magnetic field source comprising a permanent magnet,
the magnetic force having at least a passive component that opposes lateral deviation of the guide plate from a direction of motion established by a respective one of the first and second guideways in which the guide plate is in the vicinity, even in the absence of motion by the guide plate relative to that guideway in the direction of motion established thereby, and
the guide plate adapted to be coupled to the vehicle for guiding a path of motion thereof.

44. A system according to claim 43, wherein the guide plate switches from moving along the first guideway to moving along the second guideway when magnetic force between the guide plate and the second guideway is greater than the magnetic force between the guide plate and the first guideway.

45. A system according to claim 44, wherein the second guideway comprises an electromagnet for selectively inducing a greater magnetic force between the guide plate and at least a portion of the second guideway than the magnetic force between the guide plate and the first guideway.

46. A system according to claim 44, wherein at least one of the first and second guideways is moved to induce a greater magnetic force between the guide plate and at least a portion of the second guideway than the magnetic force between the guide plate and the first guideway.

47. A system for conveyance, comprising
a guideway,
a vehicle having
a guide plate for moving along the guideway,
one or more castors on which the vehicle moves,
a magnetic field source for inducing a magnetic force between the guide plate and at least a portion of the guideway in a vicinity of the guide plate,
the magnetic force having at least a passive component that opposes lateral deviation of the guide plate from a direction of motion established by the guideway, even in the absence of motion by the guide plate relative to the guideway in that direction of motion.

48. A system according to claim 47, wherein the castors is arranged to trail a direction of motion of the vehicle.

49. A system for guidance of a vehicle, comprising
a guideway,
a guide plate that moves along the guideway and that is adapted to be coupled to the vehicle for guiding a path of motion thereof,
at least one of the guideway and the guideplate comprising a permanent magnet,
the guide plate and guideway having poles that are disposed in opposing physical relationship to one another and that are of opposing magnet polarities to one another, and
the opposing poles of the guide plate and guideway giving rise to a magnetic force the magnetic force having at least a passive component that opposes lateral deviation of the guide plate from a direction of motion established by the guideway, even in the absence of motion by the guide plate relative to the guideway in that direction of motion.

50. A system according to claim 49, wherein a magnetic flux between the poles of guideway and guide plate is focussed.

51. A system according to claim 50, wherein the poles of at least one of the guideway and guide plate comprise tips of any of a ferromagnetic material and a paramagnetic material for focussing the magnetic flux.

52. A system for guidance of a vehicle, comprising a guideway, a guide plate that moves along the guideway and that is adapted to be coupled to the vehicle for guiding a path of motion thereof, at least one of the guideway and guide plate comprising a permanent magnet, each of the guideway and the guide plate comprising a pair of poles of opposing magnetic polarities to one another, each of the poles of the guide plate being disposed in opposing physical relationship to a corresponding pole of the pair of poles of the guideway and being of opposite polarity to that corresponding pole, the opposing poles of the guide plate and guideway giving rise to magnetic forces that have at least a passive component that opposes lateral deviation of the guide plate from a direction of motion established by the guideway, even in the absence of motion by the guide plate relative to the guideway in that direction of motion.

53. A system according to claim 52, wherein a spacing between the poles of the guide plate differs from a spacing between the corresponding poles of the guideway.

54. A system according to claim 53, wherein the spacing between the poles of the guide plate is greater than a spacing between the corresponding poles of the guideway.

55. A system for guidance of a vehicle, comprising a guideway, a guide plate that moves along the guideway and that is adapted to be coupled to the vehicle for guiding a path of motion thereof, each of the guideway and the guide plate comprising a pair of poles of opposing magnetic polarities to one another, the guide plate comprising a pair of magnetic field sources, one pole of each of which comprises a pole of the guide plate, at least one of the magnetic field sources comprising a permanent magnet, each of the poles of the guide plate being disposed in opposing physical relationship to a corresponding pole of the pair of poles of the guideway and being of opposite polarity to that corresponding pole, and the opposing poles of the guide plate and guideway giving rise to magnetic forces that have at least a passive component that opposes lateral deviation of the guide plate from a direction of motion established by the guideway, even in the absence of motion by the guide plate relative to the guideway in that direction of motion.

56. A system according to claim 55, wherein the poles of the guide plate comprise tips of any of a ferromagnetic material and a paramagnetic material for focussing a magnetic flux between those poles and the corresponding poles of the guideway.

57. A system according to claim 55, comprising any of a ferromagnetic and paramagnetic material for magnetic coupling those poles of the magnetic field sources that do not comprise a pole of the guide plate.

58. A system according to claim 55, wherein the guideway comprises any of a ferromagnetic and paramagnetic material.

59. A system according to claim 58, wherein the poles of the guideway comprise any of ferromagnetic and paramagnetic members having ends disposed in opposing physical relationship to the corresponding poles of the guide plate.

60. A system according to claim 59, wherein a cross-section of those members is decreased at the ends disposed in opposing physical relationship to the corresponding poles of the guide plate.

61. A system according to claim 55, wherein the guideway comprises a laminate of any of a ferromagnetic and paramagnetic material.

62. A system according to claim 61, wherein the laminate is formed with a pair of members having ends disposed in opposing physical relationship to the corresponding poles of the guide plate, wherein a cross-section of those members is decreased at the ends disposed in opposing physical relationship to the corresponding poles of the guide plate.

63. An object guidance system, comprising a guideway, a guide plate for moving along the guideway, a magnetic field source for inducing an attractive magnetic force between the guide plate and at least a portion of the guideway in a vicinity of the guide plate, the magnetic field source comprising a permanent magnet, the magnetic force having at least a passive component that opposes lateral deviation of the guide plate from a direction of motion established by the guideway, even in the absence of motion by the guide plate relative to the guideway in that direction of motion, and the guide plate being coupled to the object for guiding a path of motion thereof.

64. A system according to claim 63, wherein at least one of the guideway and guide plate comprises the magnetic field source.

65. A system according to claim 63, wherein at least one of the guide plate and guideway comprises a permanent magnet and the other comprises any of a ferromagnetic material and paramagnet material.

66. A system according to claim 63, wherein the object is a flywheel.

* * * * *